United States Patent [19]

Brenneisen et al.

[11] Patent Number: 4,502,866
[45] Date of Patent: Mar. 5, 1985

[54] SYMMETRICAL UNSUBSTITUTED AND SUBSTITUTED 2-HALO-4-(4'-(TRISULFONAPHTHYLAZO)-PHENYLAMINO)-1,3,5-TRIAZIN-6-YLAMINO COMPOUNDS

[75] Inventors: Kurt Brenneisen, Grenzach-Wyhlen, Fed. Rep. of Germany; Werner Koch, Bottmingen, Switzerland

[73] Assignee: Sandoz Ltd., Basel, Switzerland

[21] Appl. No.: 210,770

[22] Filed: Nov. 28, 1980

[30] Foreign Application Priority Data

Dec. 6, 1979 [CH] Switzerland .................. 10833/79
Apr. 8, 1980 [CH] Switzerland .................. 2700/80

[51] Int. Cl.$^3$ .................. C07C 251/50; C09B 62/04
[52] U.S. Cl. .................. 8/549; 534/803
[58] Field of Search .................. 260/153; 8/549

[56] References Cited

U.S. PATENT DOCUMENTS

| | | | |
|---|---|---|---|
| 3,646,002 | 2/1972 | Andrew et al. | 260/153 X |
| 3,647,778 | 3/1972 | Andrew et al. | 260/153 |
| 4,148,790 | 4/1979 | Sueda et al. | 260/146 T X |

FOREIGN PATENT DOCUMENTS

| | | | |
|---|---|---|---|
| 2611550 | 9/1976 | Fed. Rep. of Germany | 260/153 |
| 50-107277 | 8/1975 | Japan | 260/153 |
| 51-26386 | 3/1976 | Japan | 260/153 |
| 422196 | 4/1967 | Switzerland | 260/153 |
| 774925 | 5/1957 | United Kingdom | 260/153 |
| 785222 | 10/1957 | United Kingdom | 260/153 |
| 854432 | 11/1960 | United Kingdom | 260/153 |
| 1272291 | 4/1972 | United Kingdom | 260/153 |
| 1283771 | 8/1972 | United Kingdom | 260/153 |
| 1405016 | 9/1975 | United Kingdom | 260/153 |
| 1461125 | 1/1977 | United Kingdom | 260/153 |

*Primary Examiner*—Charles F. Warren
*Attorney, Agent, or Firm*—Gerald D. Sharkin; Richard E. Vila; Melvyn M. Kassenoff

[57] ABSTRACT

Symmetrical compounds of the formula,

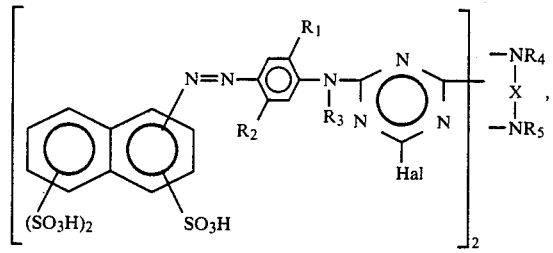

in which $R_1$ is hydrogen, $C_{1-4}$ alkyl or $C_{1-4}$ alkoxy,
$R_2$ is hydrogen, $C_{1-4}$ alkyl, $C_{1-4}$ alkoxy or $-NHCOR_6$,
$R_3$ is hydrogen or $C_{1-4}$ alkyl,
each of $R_4$ and $R_5$, independently, is hydrogen, $C_{1-4}$ alkyl or hydroxy $C_{2-4}$ alkyl,
$R_6$ is $C_{1-4}$ alkyl, $-NH_2$, $-NC(C_{1-4}$alkyl) or $-N(C_{1-4}$alkyl)$_2$,
Hal is fluorine, chlorine or bromine, and
X is either $C_{2-10}$alkylene, $C_{3-10}$alkenylene, mono- or dihydroxy $C_{3-10}$alkylene optionally containing one or two hetero atom linkages $C_{5-7}$cycloalkylene optionally substituted by 1 or 3 $C_{1-4}$alkyl groups, or X together with

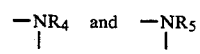

form a piperazine ring, with the proviso that X is other than unsubstituted $C_{2-10}$alkylene when $R_2$ is $-NHCOR_6$, salts thereof and, mixtures of such compounds, which compounds are useful as fibre-reactive dyestuffs for dyeing and printing hydroxy group-containing and nitrogen-containing organic substrates, e.g., leather and textiles comprising or consisting of natural or synthetic polyamides such as wool, silk and nylon or natural or regenerated cellulose such as cotton, viscose and spun rayon.

20 Claims, No Drawings

SYMMETRICAL UNSUBSTITUTED AND SUBSTITUTED 2-HALO-4-(4'-(TRISULFONAPHTHYLAZO)-PHENYLAMINO)-1,3,5-TRIAZIN-6-YLAMINO COMPOUNDS

The present invention relates to halotriazinyl compounds, their preparation and use as fibre-reactive dyestuffs.

More particularly, the present invention provides symmetrical compounds of formula I,

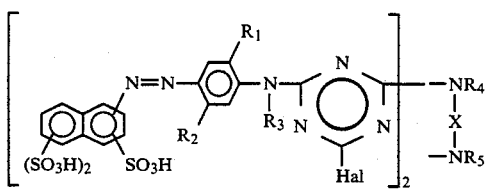

in which
$R_1$ is hydrogen, $C_{1-4}$alkyl or $C_{1-4}$alkoxy,
$R_2$ is hydrogen, $C_{1-4}$alkyl, $C_{1-4}$alkoxy or —NHCOR$_6$,
$R_3$ is hydrogen or $C_{1-4}$alkyl,
each of $R_4$ and $R_5$, independently, is hydrogen, $C_{1-4}$alkyl or 2-, 3- or 4-hydroxy-$C_{2-4}$alkyl,
$R_6$ is $C_{1-4}$alkyl, —NH$_2$, —NH($C_{1-4}$alkyl) or —N($C_{1-4}$alkyl)$_2$,
Hal is fluorine, chlorine or bromine, and
X is either $C_{2-10}$alkylene, $C_{3-10}$alkenylene, mono- or di-hydroxy-substituted $C_{3-10}$alkylene optionally containing one or two hetero atom linkages or $C_{5-7}$cycloalkylene optionally substituted by 1 to 3 $C_{1-4}$alkyl groups
or X, together with

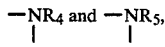

forms a piperazine ring, with the proviso that X is other than unsubstituted $C_{2-10}$alkylene when $R_2$ is —NHCOR$_6$,
salts thereof and mixtures of such compounds.

The alkylene radicals as X whether unsubstituted, hydroxy-substituted and/or containing hetero linkages may be straight chain or branched. When such alkylene contains hetero linkages such as —O— or —N($C_{1-4}$alkyl) such hetero linkages are separated from the —NR$_4$— and —NR$_5$— groups, the hydroxy groups and from each other by at least two carbon atoms. Similarly the hydroxy groups are separated from each other and from the —NR$_4$— and —NR$_5$— groups by at least two carbon atoms.

When X signifies unsubstituted alkylene such alkylene preferably contains from 2 to 8, more preferably from 2 to 6 carbon atoms. When X signifies hydroxy-substituted alkylene such alkylene preferably contains from 3 to 8, more preferably from 3 to 6 carbon atoms and is preferably free from hetero linkages and is most preferably substituted by a single hydroxy group.

Any cycloalkylene as X is preferably unsubstituted or substituted by from 1 to 3 methyl groups. More preferably any cycloalkylene as X is unsubstituted cyclohexylene or cyclohexyl substituted by from 1 to 3 methyl groups. Most preferably any cycloalkylene as X is cyclohexylene.

Preferably X is X', where X' is $C_{2-10}$alkylene, $C_{3-10}$alkenylene, $C_{3-10}$alkylene substituted by one or two hydroxy groups and optionally containing one or two linkages selected from —O— and —N($C_{1-4}$alkyl); cyclohexylene or cyclohexylene substituted by up to three methyl groups or X, together with NR$_4$— and NR$_5$—, forms a piperazine ring.

More preferably, X is X", where X" is $C_{2-10}$alkylene, $C_{3-10}$alkylene substituted by one or two hydroxy groups or cyclohexylene.

Even more preferably X is X''', where X''' is $C_{2-8}$alkylene (especially $C_{2-6}$alkylene) or $C_{3-8}$alkylene (especially $C_{3-6}$alkylene) monosubstituted by hydroxy.

Most preferably X is X$^{iv}$, where X$^{iv}$ is $C_{3-8}$(pref. $C_{3-6}$) alkylene monosubstituted by hydroxy, with

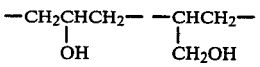

being especially preferred.

In the diazo component radical the azo group is in the 1- or 2-position, preferably in the 2-position. When the azo group is in the 2-position the sulpho groups are preferably in the 3,6,8, 4,6,8, 1,5,7 or 3,5,7 positions, more preferably in the 3,6,8 or 4,6,8 positions, with those in which the sulpho groups are in the 4,6,8 positions being most preferred. When the azo group is bound to the 1-position the sulpho groups are preferably in the 2,5,7 or 3,6,8 positions.

Any alkyl as $R_1$, $R_2$, $R_3$, $R_4$, $R_5$ and $R_6$ preferably contains 1 or 2 carbon atoms, more preferably 1 carbon atom. Similarly any alkyl in the alkylamino or dialkylamino groups as $R_6$ preferably contains 1 or 2 carbon atoms.

Any hydroxyalkyl as $R_4$ and/or $R_5$ is preferably 2-hydroxyethyl.

Any alkoxy as $R_1$ and $R_2$ preferably contains 1 or 2 carbon atoms, with methoxy being most preferred.

Preferably $R_1$ is $R_1'$, where $R_1'$ is hydrogen, methyl or methoxy. More preferably $R_1$ is $R_1''$, where $R_1''$ is hydrogen or methoxy. When $R_2$ is —NHCOR$_6$, $R_1$ is most preferably hydrogen.

$R_2$ is preferably $R_2'$, where $R_2'$ is hydrogen, methyl or —NHCOR$_6'$, where $R_6'$ is methyl, ethyl, —NH$_2$, —NH($C_{1-2}$alkyl) or —N($C_{1-2}$alkyl)$_2$. More preferably, $R_2$ is $R_2''$, where $R_2''$ is hydrogen, methyl or —NHCOR$_6''$, where $R_6''$ is methyl, ethyl or —NH$_2$. Most preferably $R_2$ is $R_2'''$, where $R_2'''$ is hydrogen, methyl or —NHCOR$_6'''$, where $R_6'''$ is methyl or —NH$_2$.

$R_3$ is preferably hydrogen.

Each of $R_4$ and $R_5$, independently, is preferably hydrogen or methyl, more preferably hydrogen.

Hal is preferably fluorine or chlorine, more preferably chlorine.

Preferred compounds of formula I are
(1) those wherein X is X';
(2) those of (1) wherein the azo group is bound to the 2-position of the naphthalene nucleus and the sulpho groups are in the 3,6,8, 4,6,8, 1,5,7 or 3,5,7 positions;
(3) those of (1) and/or (2) wherein X, is X" especially those where X is X''';
(4) those of (2) or (3) wherein $R_1$ is $R_1'$ and $R_2$ is $R_2'$;
(5) those of (1) to (4) in which Hal is fluorine or chlorine, preferably chlorine;

(6) those of (1) to (5) in which $R_3$ is hydrogen and each of $R_4$ and $R_5$, independently, is hydrogen or methyl;

(7) those of (6) wherein each of $R_4$ and $R_5$ is hydrogen;

(8) those of formula Ia

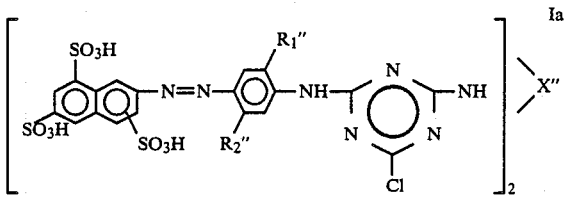

and the floating sulpho group is in the 3- or 4-position;

(9) those of (1) to (8) wherein X is $X'''$;

(10) those of (1) to (8) where X is $X^{iv}$, preferably

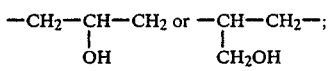

(11) those of (8), (9) or (10) wherein $R_2$ is $R_2'''$;

(12) those of (1) to (11) wherein when $R_2$ is —NH-COR$_6$, —NHCOR$_6'$, —NHCOR$_6''$ or —NHCOR$_6'''$, $R_1$, $R_1'$ or $R_1''$ is hydrogen;

(13) those wherein X is $C_{3-10}$alkylene substituted by one or two hydroxy groups, especially $C_{3-6}$alkylene monosubstituted by hydroxy.

The salt form of the compounds is not critical and the salts may be any of those common for fibre-reactive dyestuffs such as alkali metal salts or ammonium salts e.g. lithium, sodium, potassium, ammonium, mono-, di-, tri- and tetramethylammonium and mono- di- and triethylammonium. Generally owing to the preparation and isolation conditions the compounds are obtained as alkali metal salts or ammonium salts, especially sodium salts.

The present invention further provides a process for the production of compounds of formula I, as defined above, comprising condensing a compound of formula II

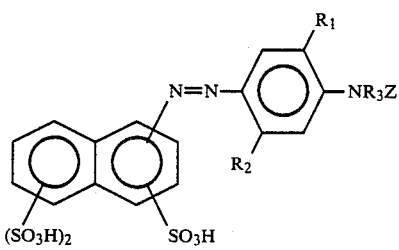

which compound is in free acid or salt form or a mixture of such compounds, with a compound of formula III

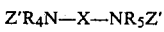

or a mixture thereof, in at least a 2:1 mol ratio, wherein either Z is hydrogen and each Z' is a radical of formula (a)

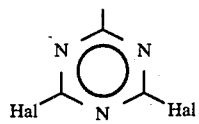

or Z is a radical of formula (a) and each Z' is hydrogen.

The preferred process is one where the compound of formula II wherein Z is a radical of formula (a) is condensed with a compound of formula III.

The condensation reaction is carried out in accordance with known methods. Suitably the reaction is effected in weakly alkaline to weakly acid medium. The temperature may be between room temperature and 65° C. An acid binding agent for example sodium carbonate, triethylamine etc. is advantageously employed. The compounds are isolated in accordance with known methods.

The compounds of formulae II and III where Z and each Z' is hydrogen are either known or may be prepared in accordance with known methods. Similarly, the compounds of formulae II and III where Z and each Z' is a radical of formula (a) are prepared by known methods by condensing the compounds wherein Z and Z' are hydrogen with a cyanuric halide. This condensation may be effected as described above for the condensation of the compound of formula II with the compound of formula III. However, owing to the ease with which the first halo atom reacts the reaction temperature may be lower e.g. from 0° to 10° C.

The compounds of formula I and mixtures thereof are useful as reactive dyestuffs for dyeing or printing hydroxy- or nitrogen-containing organic substrates. Preferred substrates are leather and textiles comprising or consisting of natural or synthetic polyamides such as wool, silk and nylon and natural or regenerated cellulose such as cotton, viscose and spun rayon. Dyeing is effected in accordance with known methods for reactive dyestuffs. When Hal is chlorine, dyeing may be effected equally well at 80° C. as at 100° C. Preferably dyeing is effected by the exhaust method.

The dyeings obtained have good wet fastness such as wash-, water- and sweat-fastness, the dyestuffs give good dye yield and are only very slightly affected by salts. Further, the dyeings have good fastness to chlorine and peroxide bleaches.

The following Examples further serve to illustrate the invention. In the Examples all parts are by weight and the temperatures are in degrees Centigrade.

EXAMPLE 1

191.5 Parts 2-aminonaphthalene-3,6,8-trisulphonic acid are suspended in 500 parts water. After the addition of 125 parts 30% hydrochloric acid with the addition of ice to cool to 0° to 6°, diazotization is carried out over a period of 45 minutes with 125 parts 4N sodium nitrite solution. Stirring is effected for 1 hour and excess nitrite is decomposed with aminosulphonic acid.

75.5 Parts 1-amino-3-ureidobenzene are dissolved in 250 parts water with the addition of 50 parts 30% hydrochloric acid and cooling to a temperature under 5° with ice. The diazo suspension obtained as described above is slowly added thereto with simultaneous addition of 100 parts sodium acetate (crystalline), portionwise. The solution is stirred overnight and then adjusted to pH 4.5 with a little 20% soda solution and salted out with approximately 10 mol % sodium chloride. The dye is filtered off and dried in vacuo at 80°-90° C.

At approximately 2°, 50 parts cyanuric chloride are added to a solution of the dyestuff so obtained in 800 parts water, the pH of which solution being adjusted to 8.5. Stirring is effected overnight at a temperature not exceeding 5°. Subsequently, 33.4 parts cyanuric chloride are added, the pH is adjusted to approximately 8 with triethylamine and stirring is effected for a further 5 hours at 5° to 10°. After completion of the condensation the reaction mixture is treated with activated charcoal and then filtered clear.

20.2 Parts 1,3-diaminopropanol-2 in 600 parts are added to the so-obtained dyestuff solution which is stirred overnight at room temperature, the mixture is adjusted to pH 8 and the whole is stirred at approximately 40° to 50° C. for approximately a further 6 hours. The product is salted out with sodium chloride, filtered and dried in vacuo.

The product which corresponds to the formula

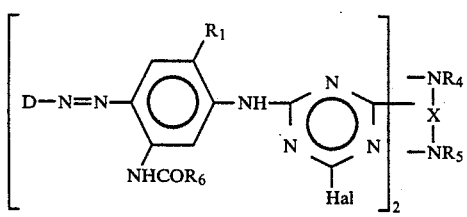

dyes natural and regenerated cellulose in golden yellow shades; the dyeings are not sensitive to salts and are fast to chlorine.

Spectrophotometric analysis (solvent water) gave λ max=424 nm.

In analogy with the procedure of Example 1 further compounds given in Table 1 may be prepared. They correspond to the general formula

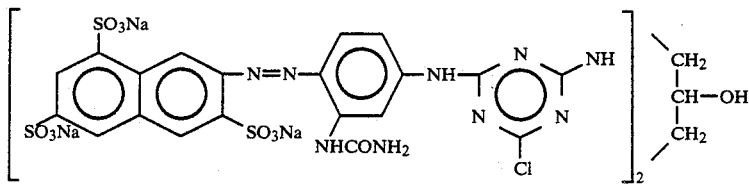

and the symbols for D have the following significances:
A=4,6,8-trisulphonaphthyl-2
B=3,6,8-trisulphonaphthyl-2
E=1,5,7-trisulphonaphthyl-2
F=3,5,7-trisulphonaphthyl-2
G=2,5,7-trisulphonaphthyl-1.

The compounds are obtained in the sodium salt form.

The compounds of Table 1 dye cotton by the exhaust method in golden yellow shades.

| Example No. | D | $R_1$ | $R_6$ | Hal | $R_4$ | $R_5$ | —X— |
|---|---|---|---|---|---|---|---|
| 2 | A | H | $NH_2$ | Cl | H | H | $-CH_2\underset{\underset{OH}{\vert}}{CH}CH_2-$ |
| 3 | E | H | " | Cl | H | H | " |
| 4 | F | H | " | Cl | H | H | " |
| 5 | B | H | " | Cl | H | H | $-\underset{\underset{CH_3}{\vert}}{\overset{\overset{CH_3}{\vert}}{C}}-CH_2-\underset{\underset{H}{\vert}}{\overset{\overset{OH}{\vert}}{C}}-CH_2-\underset{\underset{CH_3}{\vert}}{\overset{\overset{CH_3}{\vert}}{C}}$ |
| 6 | B | H | " | F | H | H | $-CH_2-CH(OH)-CH_2$ |
| 7 | B | H | " | Cl | H | H | mixture of $-CH_2\underset{\underset{OH}{\vert}}{CH}CH_2-$ and $-\underset{\underset{CH_2OH}{\vert}}{CH}CH_2-$ |
| 8 | A | H | " | Cl | H | H | mixture of $-CH_2\underset{\underset{OH}{\vert}}{CH}CH_2-$ and $-\underset{\underset{CH_2OH}{\vert}}{CH}CH_2-$ |
| 9 | G | H | " | Cl | H | H | mixture of $-CH_2\underset{\underset{OH}{\vert}}{CH}CH_2-$ and $-\underset{\underset{CH_2OH}{\vert}}{CH}CH_2-$ |
| 10 | A | H | $CH_3$ | Cl | H | H | mixture of $-CH_2\underset{\underset{OH}{\vert}}{CH}CH_2-$ and $-\underset{\underset{CH_2OH}{\vert}}{CH}CH_2-$ |
| 11 | A | H | " | F | H | H | mixture of $-CH_2\underset{\underset{OH}{\vert}}{CH}CH_2-$ and $-\underset{\underset{CH_2OH}{\vert}}{CH}CH_2-$ |
| 12 | B | H | " | Cl | H | H | mixture of $-CH_2\underset{\underset{OH}{\vert}}{CH}CH_2-$ and $-\underset{\underset{CH_2OH}{\vert}}{CH}CH_2-$ |
| 13 | B | H | $C_2H_5$ | Cl | H | H | mixture of $-CH_2\underset{\underset{OH}{\vert}}{CH}CH_2-$ and |

-continued

| Example No. | D | R1 | R6 | Hal | R4 | R5 | —X— |
|---|---|---|---|---|---|---|---|
| 14 | A | H | CH3 | Cl | H | H | —CH2CHCH2—<br>       \|<br>      OH |
| 15 | B | H | NH2 | Cl | H | H | —CH2CH2CHCH2CH2—<br>            \|<br>           OH |
| 16 | A | H | CH3 | Cl | H | H | " |
| 17 | E | H | " | F | H | H | —CH2CH2CHCH2CH2—<br>            \|<br>           OH |
| 18 | B | H | NH2 | Cl | H | H | 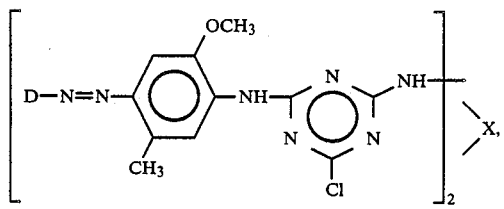 |
| 19 | A | H | " | Cl | H | H | " |
| 20 | B | H | " | Cl |   |   | 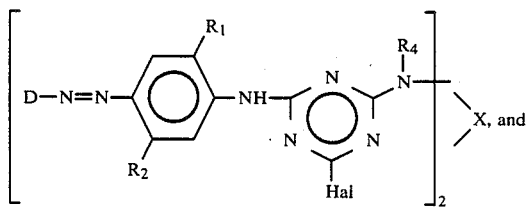 |
| 21 | A | H | " | Cl |   |   | " |

The following compounds given in Tables 2, 3 and 4 may be prepared in analogy with the procedure described in Example 1 and are thus obtained as sodium salts.

The compounds of Table 2 correspond to the formula

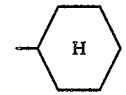

the compounds of Table 3 to the formula

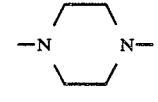

and the compounds of Table 4 to the formula

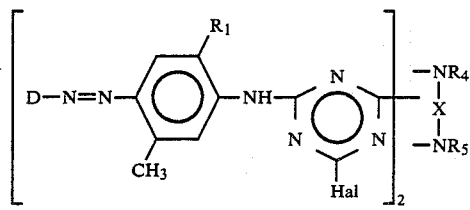

The symbols for D have the same significances as given above.

The compounds of Table 2 give dyeings of golden yellow shades on cotton and those of Tables 3 and 4 give dyeings on cotton of the shade indicated in the Table where a=yellow, b=reddish yellow and c=golden yellow.

TABLE 2

| Ex. No. | D | —X— |
|---|---|---|
| 22 | A | —CH2—CHCH2—<br>         \|<br>        OH |
| 23 | A | —CH2—CH2— |
| 24 | B | " |
| 25 | A | —(CH2)3— |
| 26 | B | " |
| 27 | A | —CH—CH2—<br>  \|<br> CH3 |
| 28 | B | " |
| 29 | A | —(CH2)4— |
| 30 | B | " |
| 31 | A | $\quad$ CH3<br>         \|<br>—CH2—C—CH2—<br>         \|<br>        CH3 |
| 32 | B | " |
| 33 | A | —(CH2)6— |
| 34 | B | " |
| 35 | B | —CH2—CH—CH2—<br>        \|<br>       OH |
| 36 | A | 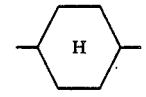 |
| 37 | B | " |
| 38 | A | —CH2—C(CH3)2—CH2— |
| 39 | B | " |
| 40 | E | —CH2CH2— |
| 41 | F | " |
| 42 | G | " |
| 43 | E | —(CH2)6— |
| 44 | F | " |
| 45 | G | " |
| 46 | E | $\quad$ OH<br>              \|<br>—CH2—CH—CH2— |
| 47 | F | " |
| 48 | G | " |
| 49 | E | —(CH2)4— |
| 50 | E | " |
| 51 | G | " |
| 52 | A | mixture of |

TABLE 2-continued

| Ex. No. | D | —X— |
|---|---|---|
|  |  | —CH₂—CH(OH)—CH₂— and —CH(CH₂OH)—CH₂— |
| 53 | B | mixture of —CH₂—CH(OH)—CH₂— and —CH(CH₂OH)—CH₂— |

TABLE 3

| Ex. No. | D | R₁ | R₂ | R₄ | Hal | —X— | Dye Shade on cotton |
|---|---|---|---|---|---|---|---|
| 54 | A | OCH₃ | CH₃ | CH₃ | Cl | —CH₂CH₂— | c |
| 55 | B | " | " | " | Cl | " | c |
| 56 | A | " | " | H | F | " | c |
| 57 | B | " | " | H | F | " | c |
| 58 | A | " | " | H | F | —(CH₂)₆— | c |
| 59 | A | " | " | H | F | —CH₂CH(OH)—CH₂— | c |
| 60 | A | H | " | H | Cl | —CH₂CH₂— | b |
| 61 | B | H | " | H | Cl | " | b |
| 62 | A | H | CH₃ | H | Cl | —(CH₂)₄— | b |
| 63 | B | H | " | H | Cl | " | b |
| 64 | F | H | " | H | Cl | " | b |
| 65 | A | H | " | H | Cl | —(CH₂)₆— | b |
| 66 | B | H | " | H | Cl | " | b |
| 67 | A | H | " | H | Cl | —CH₂—CH(OH)—CH₂— | b |
| 68 | B | H | " | H | Cl | " | b |
| 69 | A | H | H | H | Cl | " | a |
| 70 | B | H | H | H | Cl | " | a |
| 71 | A | H | CH₃ | CH₃ | Cl | —CH₂CH₂— | b |
| 72 | E | OCH₃ | " | H | F | —(CH₂)₄— | c |
| 73 | G | H | H | H | Cl | —CH₂CH₂— | a |
| 74 | A | H | CH₃ | H | Cl | —CH(CH₃)—CH₂— | b |
| 75 | B | H | " | H | Cl | " | b |
| 76 | A | H | " | H | F | —(CH₂)₄— | b |
| 77 | F | H | " | H | Cl | " | b |
| 78 | A | H | " | H | Cl | —⬡— (para-phenylene) | b |
| 79 | A | H | " | H | Cl | —(CH₂)₃— | b |
| 80 | A | H | " | H | Cl | —CH₂—C(CH₃)₂—CH₂— | b |
| 81 | A | H | " | H | Cl | —CH₂CH₂—/ | b |
| 82 | A | H | " | H | Cl | —CH(CH₂OH)—CH₂— | b |
| 83 | A | H | " | H | Cl | mixture of —CHCH₂— and CH₂OH —CH₂CH(OH)CH₂— | b |

TABLE 4

| Example No. | D | R₁ | R₅ | —X— | Dye shade on cotton |
|---|---|---|---|---|---|
| 84 | A | H | CH₃ | —CH₂CH₂— | b |
| 85 | A | H | " | —(CH₂)₃— | b |
| 86 | A | H | C₂H₅ | —CH₂CH₂— | b |
| 87 | B | H | " | " | b |
| 88 | A | H | " | —(CH₂)₃— | b |
| 89 | A | H | —CH₂CH₂OH | —CH₂CH₂— | b |
| 90 | A | OCH₃ | CH₃ | " | c |
| 91 | B | " | " | " | c |
| 92 | A | " | " | —(CH₂)₃— | c |
| 93 | A | " | —CH₂CH₂OH | —CH₂CH₂— | c |

TABLE 4-continued

| Example No. | D | $R_1$ | $R_5$ | —X— | Dye shade on cotton |
|---|---|---|---|---|---|
| 94 | A | " | $C_2H_5$ | —$(CH_2)_3$— | c |

EXAMPLE 95

The dyestuff of the formula

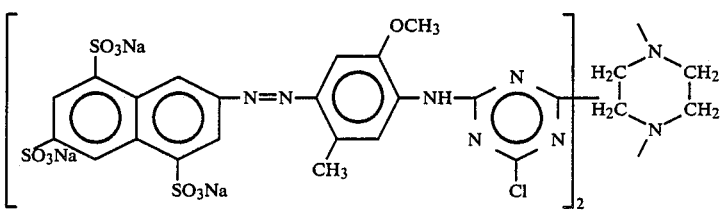

may be produced in analogy with the procedure described in Example 1. The compound dyes cotton in golden yellow shades.

APPLICATION EXAMPLE A

1 Part of the dye of Example 1 is dissolved in 100 Parts water. 100 Parts cotton are put in the dyebath and the temperature is raised to 98° within 10 minutes. 15 Parts Glauber's Salt are added and after 30 minutes 3 parts of sodium carbonate are added.

Dyeing is continued for a further hour at 98°. Subsequently, the material is rinsed cold and then hot. The dyeing is treated for 20 minutes at the boil in 500 parts water and 0.5 parts sodium alkylsulfate. After rinsing, a golden yellow dyeing with good wet fastness and chlorine fastness is obtained.

APPLICATION EXAMPLE B

1 Part of the dye of Example 6 is dissolved in 500 parts water. 15 Parts sodium chloride are added and 30 parts of a cotton fabric are added to the dyebath. The temperature is slowly raised to 40° and after 30 minutes 10 parts calcined soda and a further 15 parts sodium chloride are added. Dyeing is carried out at 40° for a further 30 minutes and the fabric is rinsed and washed as described above in Example A. A golden yellow dyeing with good fastnesses is obtained.

What we claim is:

1. A compound of the formula

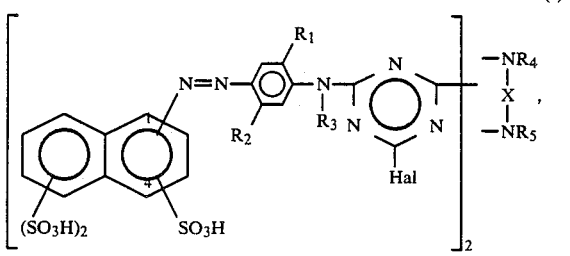

(I)

or a salt thereof, wherein each $R_1$ is hydrogen, $C_{1-4}$alkyl or $C_{1-4}$alkoxy,
each $R_2$ is hydrogen, $C_{1-4}$alkyl, $C_{1-4}$alkoxy or —NHCOR$_6$, wherein $R_6$ is $C_{1-4}$alkyl, amino, $C_{1-4}$alkylamino or di-($C_{1-4}$alkyl)amino, each $R_3$ is hydrogen or $C_{1-4}$alkyl,
each of $R_4$ and $R_5$ is independently hydrogen, $C_{1-4}$alkyl or 2-, 3- or 4-hydroxy($C_{2-4}$alkyl),
each Hal is fluoro, chloro or bromo, and
X is $C_{3-10}$alkylene monosubstituted or disubstituted by hydroxy or $C_{3-10}$alkylene monosubstituted or disubstituted by hydroxy and containing one or two radicals selected from the group consisting of —O— and —N($C_{1-4}$alkyl)—, with the provisos that (1) each hydroxy group present is separated by at least two carbon atoms from the —NR$_4$— and —NR$_5$— radicals, any other hydroxy group present and any —O— or —N($C_{1-4}$alkyl)— radical present and (2) any —O— or —N($C_{1-4}$alkyl)— radical present is separated by at least two carbon atoms from any other such radical present, the —NR$_4$— and —NR$_5$— radicals and each hydroxy group present, with the proviso that the two $R_1$'s are the same, the two $R_2$'s are the same, the two $R_3$'s are the same, the two Hal's are the same and the two naphthalene rings are identically substituted, or a mixture of such compounds in free acid or salt form.

2. A compound according to claim 1, or a salt thereof.

3. A compound according to claim 2, or a salt thereof each cation of which is lithium, sodium, potassium, ammonium, methylammonium, dimethylammonium, trimethylammonium, tetramethylammonium, ethylammonium, diethylammonium or triethylammonium.

4. A compound according to claim 3, or a salt thereof each cation of which is lithium, sodium, potassium or ammonium.

5. A compound according to claim 4, or a salt thereof each cation of which is sodium.

6. A compound according to claim 2, or a salt thereof, wherein

X is $C_{3-10}$alkylene monosubstituted or disubstituted by hydroxy, with the proviso that each hydroxy group is separated by at least two carbon atoms from the —NR$_4$— and —NR$_5$— radicals and any other hydroxy group present.

7. A compound according to claim 1, or a salt thereof, wherein

X is $C_{3-8}$alkylene monosubstituted by hydroxy, with the proviso that the hydroxy group is separated by at least two carbon atoms from the —NR$_4$— and —NR$_5$— radicals.

8. A compound according to claim 7, or a salt thereof, wherein

X is $C_{3-6}$alkylene monosubstituted by hydroxy, with the proviso that the hydroxy group is separated by at least two carbon atoms from the —NR$_4$— and —NR$_5$— radicals.

9. A compound according to claim 2, or a salt thereof, wherein each $R_1$ is hydrogen when each $R_2$ is —NHCOR$_6$.

10. A compound according to claim 2, or a salt thereof, wherein
   each $R_1$ is hydrogen, methyl or methoxy.

11. A compound according to claim 10, or a salt thereof, wherein
   each $R_1$ is hydrogen or methoxy.

12. A compound according to claim 2, or a salt thereof, wherein
   each $R_2$ is hydrogen, methyl or —NHCOR$_6'$,
      wherein $R_6'$ is methyl, ethyl, amino, $C_{1-2}$alkylamino or di-($C_{1-2}$alkyl)amino.

13. A compound according to claim 2, or a salt thereof, wherein
   each $R_3$ is hydrogen, and
   each of $R_4$ and $R_5$ is independently hydrogen or methyl.

14. A compound according to claim 2, or a salt thereof, wherein
   each Hal is fluoro or chloro.

15. A compound according to claim 2, or a salt thereof, wherein
   the azo radical is in the 2-position of each naphthalene ring and the sulfo groups are in the 3,6,8-, 4,6,8-, 1,5,7- or 3,5,7-positions of each naphthalene ring.

16. A compound according to claim 15 having the formula

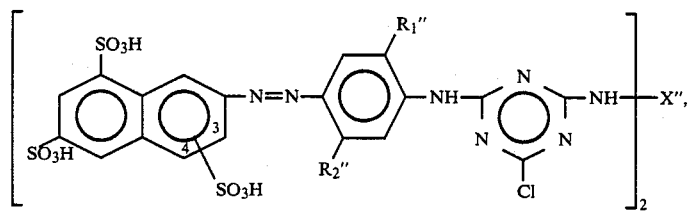

(Ia)

or a salt thereof, wherein
   each $R_1''$ is hydrogen or methoxy,
   each $R_2''$ is hydrogen, methyl or —NHCOR$_6''$,
   wherein $R_6''$ is methyl, ethyl or amino, $X''$ is $C_{3-10}$alkylene monosubstituted or disubstituted by hydroxy, with the proviso that each hydroxy group is separated by at least two carbon atoms from the —NH— radicals and any other hydroxy group present, and
   the floating sulfo groups are in the 3-position or the 4-position of each naphthalene ring.

17. A compound according to claim 16, or a salt thereof, wherein
   $X''$ is $C_{3-8}$alkylene monosubstituted by hydroxy, with the proviso that the hydroxy group is separated by at least two carbon atoms from the —NH— radicals.

18. A compound according to claim 17, or a salt thereof, wherein
   $X''$ is $C_{3-6}$alkylene monosubstituted by hydroxy, with the proviso that the hydroxy group is separated by at least two carbon atoms from the —NH— radicals.

19. A compound according to claim 18, or a salt thereof, wherein
   $X''$ is

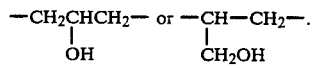

20. The compound according to claim 19 having the formula

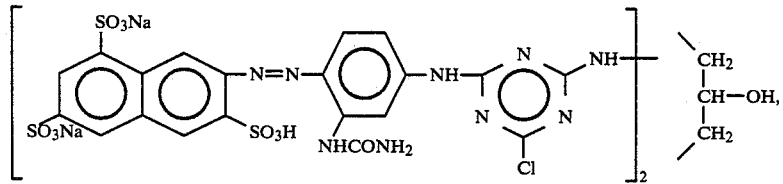

or a salt thereof.